Jan. 22, 1924.  1,481,607
C. W. HISCOCKS
APPARATUS FOR THE DISPLAY OF PICTURES, ADVERTISEMENTS, OR THE LIKE
Filed Aug. 14, 1922
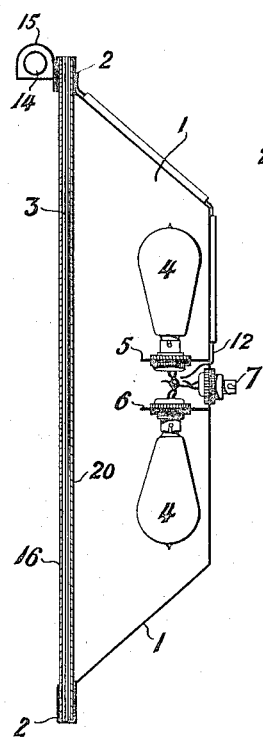
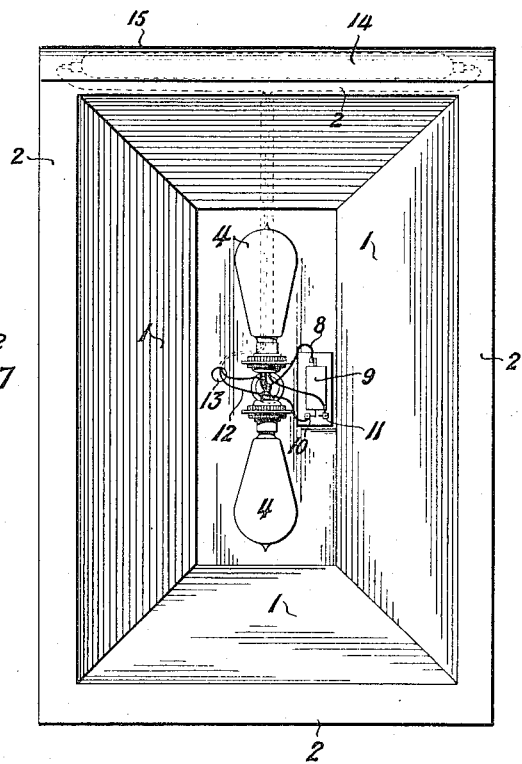
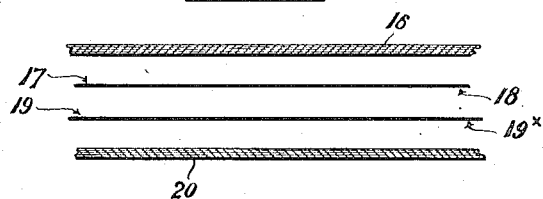

Patented Jan. 22, 1924.

1,481,607

UNITED STATES PATENT OFFICE.

CLAUDE WILLIAM HISCOCKS, OF HOLBORN, LONDON, ENGLAND.

APPARATUS FOR THE DISPLAY OF PICTURES, ADVERTISEMENTS, OR THE LIKE.

Application filed August 14, 1922. Serial No. 581,857.

*To all whom it may concern:*

Be it known that I, CLAUDE WILLIAM HISCOCKS, a subject of the King of Great Britain, residing at 36 Whetstone Park, Holborn, London, England, have invented certain new and useful Improvements in Apparatus for the Display of Pictures, Advertisements, or the like, of which the following is a specification.

This invention relates to apparatus for displaying pictures, designs, printed matter or the like, hereafter referred to as pictures, in a manner particularly suitable for advertisement, and the object of the invention is to construct an apparatus complete in itself and forming a saleable article which at one time will exhibit to the observer a first picture, and after a suitable lapse of time will exhibit a second and different picture, the change from one picture to the other picture being effected by electrical or mechanical means and without changing the actual pictures contained within the apparatus.

According to this invention an open-fronted casing is constructed, the open front of which forms a frame to contain what I term a composite picture comprisng a front sheet of glass, a front sheet of paper in contact therewith and painted on its front face with a picture in transparent colours to be exhibited by reflected light, a back sheet of paper in contact with said front sheet, said back sheet having painted on its front face the main second picture to be exhibited by transmitted light, and a back sheet of glass in contact with the said second sheet of paper and having its front face sprayed with paint to diffuse the light rays passing therethrough, the frame of said casing carrying an electric or other source of light in front of the front glass and a similar source of light within the casing at the rear of the superposed sheets, in combination with mechanical means for alternately obscuring or cutting off first the front lights and then the rear lights, and so on, at proper intervals of time. The pictures on the translucent sheets may be painted thereon, or produced by printing or other known process.

The effect of this arrangement is, that when the exterior of the casing is illuminated the first picture is visible, and when the interior of the casing is illuminated and the exterior illumination ceases, the second picture which is prepared behind the first picture is rendered visible, which second picture, being of stronger nature or of more vivid tints, overpowers the design and tints of the first picture, which is by that means rendered invisible to the onlooker, and an entire change of picture in subject or treatment is produced without any movement of the pictures themselves.

Furthermore with the complete apparatus as described, the composite picture can be removed from the frame of the casing and another similar composite picture substituted therefor, quickly and easily.

The invention will be further described with reference to the accompanying drawings, which show at Fig. 1 a front elevation of the apparatus with the glass and translucent material removed, Fig. 2 is a side sectional elevation of the apparatus with the glass and translucent material in position, and Fig. 3 shows on a larger scale the covering glass sheets and sheets of translucent material for carrying the pictures, separated.

Referring to the drawings, the apparatus comprises a sheet metal casing or container 1 open at the front and having a surrounding outer trough-like member 2 fixed to its edges or formed in a piece therewith, the said trough-like member 2 having a part cut away to form an aperture (as shown at Fig. 2) to permit of the insertion of the composite picture 3, which latter is to be displayed.

Situate in the interior of the casing behind the composite picture 3 are electric incandescent lamps 4, the said lamps 4 being carried and supported by suitable brackets 5, 6 attached to the back of the casing 1.

A conductor (not shown) from the source of electricity is connected to the terminal device 7 from which the current passes by a conductor 8 to one terminal of any suitable known mechanically or electrically-operated switch 9, which will intermittently switch the current from one terminal to another, as for instance from the terminal 10 to the terminal 11.

From the terminal 10 a conductor 12, passing through a hole 13 in the rear of the casing, transmits the current to a lamp 14 attached, together with a suitable shade 15, to the upper front face of the trough 2. From the lamp 14 the current passes through a conductor back to the terminal device 7. The remaining switch terminal 11 is connected up by means of a conductor to the lamps 4, which in turn are connected up to the terminal device 7.

Referring now to Fig. 3. (which illustrates the manner in which the sheets of covering glass and translucent material are arranged), on the face 17 of a sheet of translucent material, is painted a complete picture, and on the rear face 18 of the said sheet of translucent material there may be painted part of the second picture, the principal parts of the said second picture being painted on the face 19 of a second sheet of translucent material, the second picture being painted in either darker or more vivid tints. Furthermore the back 19× of the sheet of translucent material 19 may be also coloured or painted in suitable places in order to intensify the second picture, or assist in the obliteration of the first picture on the face 17. A sheet of glass 20 is sprayed with white paint on one of its sides in order to diffuse the light coming from the lamps 4, and a further sheet of covering glass 16 is placed in front of the first sheet 17 of translucent material and the whole may be bound round the edges with binding tape or any suitable material.

The action of the apparatus is as follows. The current passing into the case through the conductor 7 passes through the switch 9 to the terminal 10, and from thence through the conductor 12 to the lamp 14, causing it to light up and uniformly illuminate the front picture 17.

After the front picture has been subjected for a predetermined time to the rays of reflected light from the lamp 14 so that only the front picture is visible to the observer, the switch 9, which is mechanical in its action, changes the direction of the current making contact with the terminal 11 so that simultaneously the lamp 14 at the front of the exhibition case is extinguished, and the lamps 4 at the rear of the composite picture are illuminated, and then the observer will only see the rearward picture, due to the transmitted light of the lamps 4. It will be evident to anyone acquainted with the construction of apparatus of this class, that the switch may be of any suitable or known construction provided that it will operate to change the direction of a current at predetermined intervals of time, and so such a switch might be operated by clockwork or it might be an electrically-operated switch; in this connection for instance, the current passing into the switch by the conductor 8 might heat a bar of thermostatic metal and cause it to bend over and break the contact with the terminal 10 and make contact with the terminal 11, whereupon the lamp 14 will be extinguished, and the lamps 4 will illuminate the rear picture. Upon the thermostatic metal making contact with the terminal 11 the metal bar is allowed to cool, whereupon the thermostatic metal will return to its original contact with the terminal 10 and again complete the circuit which lights the lamp 14. This electric thermostatic switch does not form a part of this invention, it being already known, but it is merely suggested as a convenient form of switch for use with the apparatus of the present invention.

What I claim as my invention and desire to secure by Letters Patent is:—

1. The combination of a composite picture structure comprising an outer transparent sheet, a translucent sheet having a picture provided on its outer face, a second translucent sheet having a picture provided on its outer face and an inner translucent light diffusing sheet, said sheets arranged in the order specified, with means for alternately directing light against the outer and inner sheets.

2. The combination of a composite picture structure comprising an outer transparent sheet, a translucent sheet having a picture provided upon its outer face, a second translucent sheet having a picture provided upon its outer face, said picture on the second sheet being in darker and more vivid colors than the picture on said first translucent sheet, and an inner translucent sheet of light diffusing qualities, with means for alternately directing light against said outer and said inner sheets.

In witness whereof I have hereunto set my hand in the presence of two witnesses.

CLAUDE WILLIAM HISCOCKS.

Witnesses:
THOMAS WILLIAM ROGERS,
WILLIAM ANDREW MARSHALL.